(12) United States Patent
Kim et al.

(10) Patent No.: US 9,566,563 B2
(45) Date of Patent: Feb. 14, 2017

(54) METHOD FOR PREPARING CARBON DIOXIDE ABSORBENT BASED ON NATURAL BIOMASS AND CARBON DIOXIDE ABSORBENT BASED ON NATURAL BIOMASS PREPARED BY THE SAME

(71) Applicant: Korea Institute of Energy Research, Daejeon (KR)

(72) Inventors: Hee-Yeon Kim, Daejeon (KR); Chang-Keun Yi, Daejeon (KR); Yeo-Il Yoon, Daejeon (KR); Young-Cheol Park, Daejeon (KR); Hong-Soo Kim, Daejeon (KR); Seong-Ok Han, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 568 days.

(21) Appl. No.: 13/758,369

(22) Filed: Feb. 4, 2013

(65) Prior Publication Data

US 2013/0207033 A1   Aug. 15, 2013

(30) Foreign Application Priority Data

Feb. 10, 2012  (KR) .................. 10-2012-0013723

(51) Int. Cl.
| | | |
|---|---|---|
| B01J 20/30 | (2006.01) | |
| B01J 20/20 | (2006.01) | |
| B01D 53/02 | (2006.01) | |
| B01D 53/62 | (2006.01) | |

(52) U.S. Cl.
CPC ............ B01J 20/3078 (2013.01); B01D 53/02 (2013.01); B01D 53/62 (2013.01); B01J 20/20 (2013.01); B01J 20/3028 (2013.01); *B01D 2253/20* (2013.01); *B01D 2257/504* (2013.01); *B01J 2220/485* (2013.01); *Y02C 10/04* (2013.01); *Y02C 10/08* (2013.01)

(58) Field of Classification Search
CPC .................. B01D 53/62; B01J 20/20
See application file for complete search history.

(56) References Cited

U.S. PATENT DOCUMENTS

| | | | |
|---|---|---|---|
| 6,387,337 B1 | 5/2002 | Pennline et al. | |
| 8,361,186 B1* | 1/2013 | Shearer et al. | ................... 71/32 |
| 2009/0217575 A1* | 9/2009 | Raman | .................... C10J 3/482 |
| | | | 44/504 |
| 2011/0172092 A1* | 7/2011 | Lee | ....................... C01B 31/081 |
| | | | 502/416 |

FOREIGN PATENT DOCUMENTS

| | | |
|---|---|---|
| CN | 1480396 A | 3/2004 |
| JP | 08-206443 | 8/1996 |
| JP | 2005137981 A | 6/2005 |
| KR | 102006007958 A | 7/2006 |

OTHER PUBLICATIONS

Dictonary.com definition of grind (http://dictionary.reference.com/browse/grind?s=t) accessed Dec. 13, 2015.*
Leng et al. "Comparison of the carbon-sequestering abilities of pineapple leaf residue chars produced by controlled combustion and by field burning" Biosource Technology, 102, (2011), 10759-10762.*
Sevilla, Marta et al., "Hydrothermal carbonization of biomass as a route for the sequestration of CO2: Chemical and structural properties of the carbonized products", www.sciencedirect.com, 2011, pp. 3152-3159.
Wei Su et al., Studies on the preparation and characterization of microporous activated carbon from coconut shell, Engineering Science and Technology I, Dec. 15, 2004, pp. 30-31, 38, 107-108, vol. 4.
Notice of Allowance for corresponding Korean Patent Application No. 10-2012-0013723, mailed on May 20, 2014.
Office Action for corresponding Chinese Patent Application No. 201310044710.X, mailed on May 22, 2014.
Office Action for corresponding Chinese Patent Application No. 201310044710.X, mailed on Jan. 12, 2015.

* cited by examiner

*Primary Examiner* — Peter F Godenschwager
(74) *Attorney, Agent, or Firm* — Westman, Champlin & Koehler, P.A.

(57) ABSTRACT

A method for preparing a carbon dioxide absorbent based on natural biomass, and a carbon dioxide absorbent based on natural biomass that is prepared by the method. The method utilizes alkali metal or alkaline earth metal components, such as Ca, Ma and K, inherent to a natural plant biomass material. The method can provide a carbon dioxide absorbent with improved performance in an environmentally friendly manner at greatly reduced cost.

6 Claims, 4 Drawing Sheets

METHOD FOR PREPARING CARBON DIOXIDE ABSORBENT BASED ON NATURAL BIOMASS AND CARBON DIOXIDE ABSORBENT BASED ON NATURAL BIOMASS PREPARED BY THE SAME

CROSS-REFERENCE TO RELATED APPLICATION(S)

This Application claims priority to Korean Patent Application No. 10-2012-0013723, filed on Feb. 10, 2012, the contents of which is incorporated by reference in its entirety.

BACKGROUND

1. Technical Field

The present invention relates to a method for preparing a carbon dioxide absorbent based on natural biomass, and a carbon dioxide absorbent based on natural biomass that is prepared by the method. More particularly, the present invention relates to a method for preparing a carbon dioxide absorbent that utilizes alkali metal or alkaline earth metal components, such as Ca, Ma and K, inherent to a natural plant biomass material, thus enabling the preparation of a highly efficient carbon dioxide absorbent at low cost.

2. Description of the Related Art

Carbon dioxide is a major cause of global warming and its concentration in the atmosphere has been sharply increasing since the Industrial Revolution. The carbon dioxide issue is considered a global problem through the Rio Declaration on Environment and Development and the Kyoto Protocol, and solutions to solve this problem have been actively studied.

Carbon dioxide sources are usually flue gases released from the burning of fossil fuels, synthetic gases produced during coal gasification, and synthetic gases produced during natural gas processing. Many methods for removing carbon dioxide are known, for example, wet chemical absorption, adsorption, membrane separation and low temperature distillation. However, these methods incur high costs and are thus difficult to commercialize.

According to a known method for removing carbon dioxide from a gas stream using a dry sorbent, an active component present in the solid sorbent is allowed to chemically react with carbon dioxide to produce a carbonate or bicarbonate. The sorbent can be regenerated and reused after heating in a regeneration reactor. The dry sorbent should meet the following requirements: 1) inexpensive materials, 2) easy regeneration, 3) applicability to low energy absorption processes, and 4) the ability to remove carbon dioxide present at a very low concentration. Other requirements for the dry sorbent are environmental friendliness, good absorptivity for carbon dioxide, and high reaction rate. Further, the dry sorbent should be made of a physically or chemically durable material.

U.S. Pat. No. 6,387,337 issued to the United States Department of Energy (DOE) suggests a method for preparing a dry sorbent using an alkali metal or alkaline earth metal compound deposited on a support. Further, Korean Patent No. 620546 discloses the preparation of a dry sorbent that uses an alkali metal or alkaline earth metal compound as an active component to increase the removal efficiency of carbon dioxide. According to this patent, the dry sorbent is prepared by dispersing a sorbent composition essentially composed of an active component, a support and an inorganic binder in water to prepare a slurry, molding the slurry in a spray dryer to prepare a granular absorbent, and calcining the absorbent. However, the above patents are based on the ability of alkali metals and alkaline earth metals to absorb carbon dioxide and are associated with artificial addition of the corresponding components for the dry carbon dioxide absorbents. No study has been, to our knowledge, reported on a technology for removing carbon dioxide utilizing alkali metals and alkaline earth metals inherent to natural biomass materials.

Thus, the present inventors have continued to investigate a method for preparing a high performance carbon dioxide absorbent in an environmentally friendly and economical manner without artificial addition of alkali metals and alkaline earth metals. As a result, the present inventors have succeeded in developing a method for preparing a high performance carbon dioxide absorbent that utilizes natural alkali and alkaline earth metals inherent to a natural biomass material, contributing to cost reduction.

BRIEF SUMMARY

It is an object of the present invention to provide a method for preparing a high performance carbon dioxide absorbent from natural plant biomass in an environmentally friendly and economical manner. It is another object of the present invention to provide a carbon dioxide absorbent based on natural biomass that is prepared by the method.

One aspect of the present invention provides a method for preparing a carbon dioxide absorbent based on natural biomass, the method including (S1) carbonizing a plant biomass material containing alkali metals or alkaline earth metals, and (S2) pulverizing the carbonized biomass material.

Now, a detailed description will be given concerning the respective steps of the method for preparing a carbon dioxide absorbent based on natural biomass according to the present invention.

First, a plant biomass material containing alkali metals or alkaline earth metals is carbonized (step S1). This carbonization enables the removal of low boiling point impurities, such as wax and pectin, from the plant biomass material and can increase the physical strength of a final carbon dioxide absorbent while improving the surface area and porosity of the carbon dioxide absorbent.

The plant biomass material used in the present invention is naturally occurring one and the kind thereof is not fundamentally limited. For example, any natural plant biomass material that contains an alkali metal selected from the group consisting of lithium, sodium and potassium or an alkaline earth metal, such as calcium or magnesium, may be used in the present invention. Plant cellulose containing large amounts of alkaline earth metal components, such as calcium (Ca) and magnesium (Mg), is particularly preferred. Any natural plant cellulose material may be used as the plant biomass material in the present invention. For example, the plant biomass material may be selected from the group consisting of, but not necessarily limited to, henequen fibers, kenaf, abaca, bamboo, hemp, flax, jute, pineapple, ramie, sisal hemp, rice straw, barley straw, wheat straw, rice husk, and mixtures thereof.

According to one embodiment of the present invention, the carbonization may be performed by raising the temperature of the plant biomass material from 500 to 1,800° C. under a nitrogen/hydrogen atmosphere in a closed state for 0.2 to 2 hours. In the present invention, as the carbonization temperature increases, the surface area of the carbonized biomass material and the ratio of the metal content of the sample to the carbon content thereof can be increased. In this step, the carbonization temperature is preferably in the range of 500 to 1,800° C., particularly preferably 900 to 1,100° C. If the carbonization is performed at a temperature not higher than 1,000° C., large amounts of tar components, such as wax and pectin, may be produced. There is thus a need to prevent a vent port from being contaminated by the impurities. To this end, a filter is installed and the impurities are periodically washed out. Alternatively, a catalytic combustion device may be introduced to remove the impurities. The nitrogen/hydrogen atmosphere in a closed state may be created by any suitable method known in the art, for example, by supplying nitrogen and hydrogen in a volume ratio of 1:1 to a quartz tube maintained in a closed state, but the present invention is not necessarily limited thereto.

According to a further embodiment of the present invention, step S1 may further include impregnating the plant biomass material with liquid nitrogen and cutting the frozen plant biomass material into 1 to 2 mm long pieces before carbonization to further enhance the effects of the subsequent carbonization.

Next, the carbonized biomass material is pulverized to prepare a carbon dioxide absorbent (step S2). This pulverization can increase the surface area of the carbonized biomass material, leading to an improvement in the performance of the carbon dioxide absorbent.

The carbon dioxide absorbent prepared in step S2 preferably has a thickness of 0.5 mm or less and a length of 1 mm or less, but is not necessarily limited to this size. The size of the carbon dioxide absorbent may be varied depending on where the absorbent is used. The method may further involve pulverizing the carbon dioxide absorbent into a finely divided powder. The fine powder may be allowed to react with an inorganic binder, such as cement, clay or ceramic, followed by molding into beads.

Another aspect of the present invention provides a carbon dioxide absorbent based on natural biomass that is prepared by carbonizing a plant biomass material containing alkali metals or alkaline earth metals and pulverizing the carbonized plant biomass material.

The carbon dioxide absorbent of the present invention can be effectively used for dry carbon dioxide absorption processes necessary to recover carbon dioxide contained in flue gases, which arise from the conversion of fossil fuels in industrial facilities, such as thermal power stations, before release into the atmosphere.

The carbon dioxide absorbent of the present invention utilizes, as active components, alkali and alkaline earth metal components in the form of highly dispersed nanoparticles that are inherently present in a natural plant biomass material. The present invention is distinguished from a conventional technology in which alkali and alkaline earth metal components as active components are dispersed on the surface of a support, such as zeolite, alumina or Celite, to absorb carbon dioxide. The present invention has the advantages that the processing cost is drastically reduced, the performance of the absorbent is improved, and the metal components, which have been discarded after use, can entirely be recovered by burning carbon components.

In addition, the alkali metal or alkaline earth metal components as active components of the carbon dioxide absorbent of the present invention are in a highly dispersed state in the natural biomass material. Therefore, there is no need for a process for maintaining a highly dispersed state of the active components upon addition, which is essential to prepare conventional carbon dioxide absorbents, contributing to a drastic reduction in processing cost.

DETAILED DESCRIPTION

Figure 1:
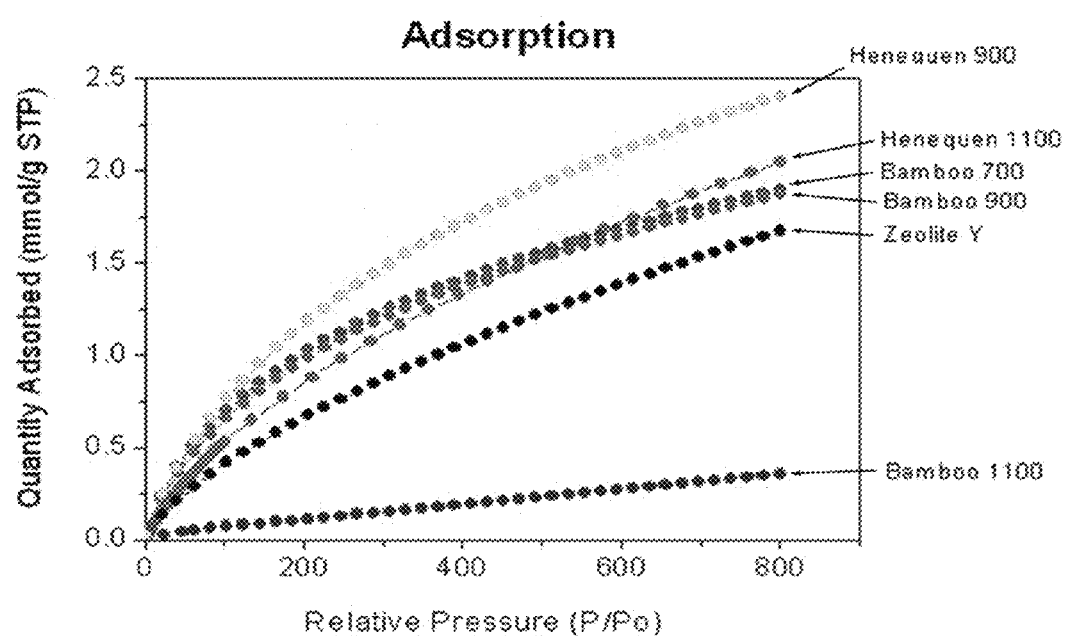
FIG. 1 shows the quantities of carbon dioxide adsorbed to carbon dioxide absorbents prepared in Examples 1 and 1-1 and Zeolite Y as a conventional carbon dioxide absorbent, which were measured in accordance with Test Example 2.

The present invention will be illustrated in more detail with reference to some examples. However, it should be understood that the following examples are provided for illustration only, and that various modifications, variations, and alterations can be made without departing from the spirit and scope of the invention. Therefore, the scope of the invention should be limited only by the accompanying claims and equivalents thereof.

EXAMPLE 1

Preparation of Carbon Dioxide Absorbents Using Natural Henequen Fibers

For ease of carbonization, natural henequen fibers were split into fiber strands having a thickness of tens to hundreds of micrometers, impregnated with liquid nitrogen, and cut into 1-2 mm long fiber pieces. After the henequen fiber samples were placed in quartz tubes, nitrogen and hydrogen in a volume ratio of 1:1 were supplied to the quartz tubes for 30 min to remove impurities from the quartz tubes. The quartz tubes in the nitrogen/hydrogen atmosphere were heated at a rate of 10° C./min to respective temperatures of 500° C., 700° C., 900° C. and 1100° C. and maintained for 1 hr at the temperatures to carbonize the henequen fibers. Thereafter, the carbonized henequen fibers were pulverized into powders using a mortar and pestle to prepare carbon dioxide absorbents.

EXAMPLE 1-1

Preparation of Carbon Dioxide Absorbents Using Natural Bamboo Samples

For ease of carbonization, pristine bamboo samples were cut in the lengthwise direction into 1-2 cm thick sticks and chopped into 1-2 cm long pieces. The bamboo pieces were cut into powders of several nm to several mm using a chopper. After the bamboo powders were placed in quartz tubes, nitrogen was supplied for 30 min to the quartz tubes to remove impurities from the quartz tube. Subsequently, the quartz tubes were heated at a rate of 10° C./min to respective temperatures of 500° C., 700° C., 900° C., 1,100° C., 1,300°

C. and 1,800° C. while supplying nitrogen and hydrogen in a volume ratio of 1:1 to the quartz tubes, and maintained for 1 hr at the temperatures to carbonize the bamboo fibers. Thereafter, the carbonized bamboo samples were pulverized into powders using a mortar and pestle to prepare carbon dioxide absorbents.

TEST EXAMPLE 1

Measurements of BET Surface Areas, Pore Volumes and Pore Sizes of the Henequen Carbonization Products (Example 1)

The BET surface areas, pore volumes and average pore diameters of Zeolite X and Zeolite Y as conventional carbon dioxide absorbents and the carbon dioxide absorbents (the henequen fibers after carbonization) prepared in Example 1 were measured using an accelerated surface area and porosimetry analyzer (ASAP2010, Micromeritics). The results are shown in Table 1. For the BET surface area measurements, the carbon dioxide absorbents were pretreated at 150° C. (heating rate=10° C./min) for 800 min and depressurized to 100 μmHg at an evacuation rate of 5.0 mmHg/s. The BET surface areas were measured at pressures of 0 to 800 mmHg and room temperature (25° C.).

TABLE 1

| Henequen carbonization temp. (° C.) | BET surface area ($m^2/g$) | Mesopores (BJH des. data) | | Micropores (H-K data) | |
|---|---|---|---|---|---|
| | | Pore volume ($cm^3/g$) | Average diameter (Å) | Maximum volume ($cm^3/g$) | Average diameter (Å) |
| Before carbonization (pristine) | 6 | — | — | — | — |
| Henequen 500 | 16 | 0.02 | 70 | 0.00 | 13 |
| Henequen 700 | 74 | 0.04 | 41 | 0.03 | 7 |
| Henequen 900 | 578 | 0.18 | 52 | 0.23 | 6 |
| Henequen 1100 | 991 | 0.38 | 50 | 0.36 | 7 |
| Zeolite X | 573 | 0.13 | 18 | 0.30 | 5 |
| Zeolite Y | 524 | 0.21 | 26 | 0.33 | 6 |

As can be seen from the results in Table 1, the BET surface areas and the mesopore and micropore volumes of the absorbents were increased with increasing carbonization temperature. The pore diameters of the absorbents were decreased with increasing temperature. The henequen fiber carbonized at a temperature of 1,100° C. was found to have the largest BET surface area, the largest pore volumes and the smallest pore diameters.

TEST EXAMPLE 1-1

Measurements of BET Surface Areas, Pore Volumes and Pore Sizes of the Bamboo Carbonization Products (Example 1-1)

The BET surface areas, pore volumes and average pore diameters of Zeolite X and Zeolite Y as conventional carbon dioxide absorbents and the carbon dioxide absorbents (the bamboo samples after carbonization) prepared in Example 1-1 were measured using an accelerated surface area and porosimetry analyzer (ASAP2010, Micromeritics). The results are shown in Table 2. For the BET surface area measurements, the carbon dioxide absorbents were pretreated at 150° C. (heating rate=10° C./min) for 800 min and depressurized to 100 nmHg at an evacuation rate of 5.0 mmHg/s. The BET surface areas were measured at pressures of 0 to 800 mmHg and room temperature (25° C.).

TABLE 2

| Bamboo carbonization temp. (° C.) | BET surface area ($m^2/g$) | Mesopores (BJH des. data) | |
|---|---|---|---|
| | | Pore volume ($cm^3/g$) | Average diameter (Å) |
| Before carbonization (pristine) | 10 | — | — |
| Bamboo 700 | 66 | 0.00 | 57 |
| Bamboo 900 | 51 | 0.01 | 36 |
| Bamboo 1100 | 13 | 0.00 | 6 |
| Bamboo 1300 | 17 | 0.01 | 5 |
| Bamboo 1500 | 7 | 0.01 | 6 |
| Bamboo 1800 | 8 | 0.01 | 6 |
| Zeolite X | 573 | 0.13 | 18 |
| Zeolite Y | 524 | 0.21 | 26 |

As can be seen from the results in Table 2, the surface areas of the bamboo samples after carbonization at a temperature of 700° C. or more tended to increase compared to those before carbonization. Specifically, the bamboo sample carbonized at 700° C. had a surface area of 66 $m^2/g$. However, the BET surface areas of the bamboo samples showed a tendency to decrease with increasing carbonization temperature, unlike the henequen samples. On the other hand, the bamboo samples had few or no mesopores and did not appear to be greatly affected by the thermal treatment temperature. The mesopore diameters of the bamboo samples showed a tendency to considerably decrease with increasing thermal treatment temperature, which is similar to the tendency of the BET surface areas. As a consequence, the bamboo product carbonized at a temperature of about 700° C. had the largest BET surface area.

TEST EXAMPLE 2

Measurements of Carbon Dioxide Adsorption (Physical and Chemical Adsorption)

The characteristics of "Henequen 900" and "Henequen 1100" prepared by carbonization of henequen at 900° C. and 1,100° C., respectively, "Bamboo 700", "Bamboo 900" and "Bamboo 1100" prepared by carbonization of bamboo at 700° C., 900° C. and 1,100° C. respectively, and commercial Zeolite Y as carbon dioxide absorbents were compared.

Figure 2:
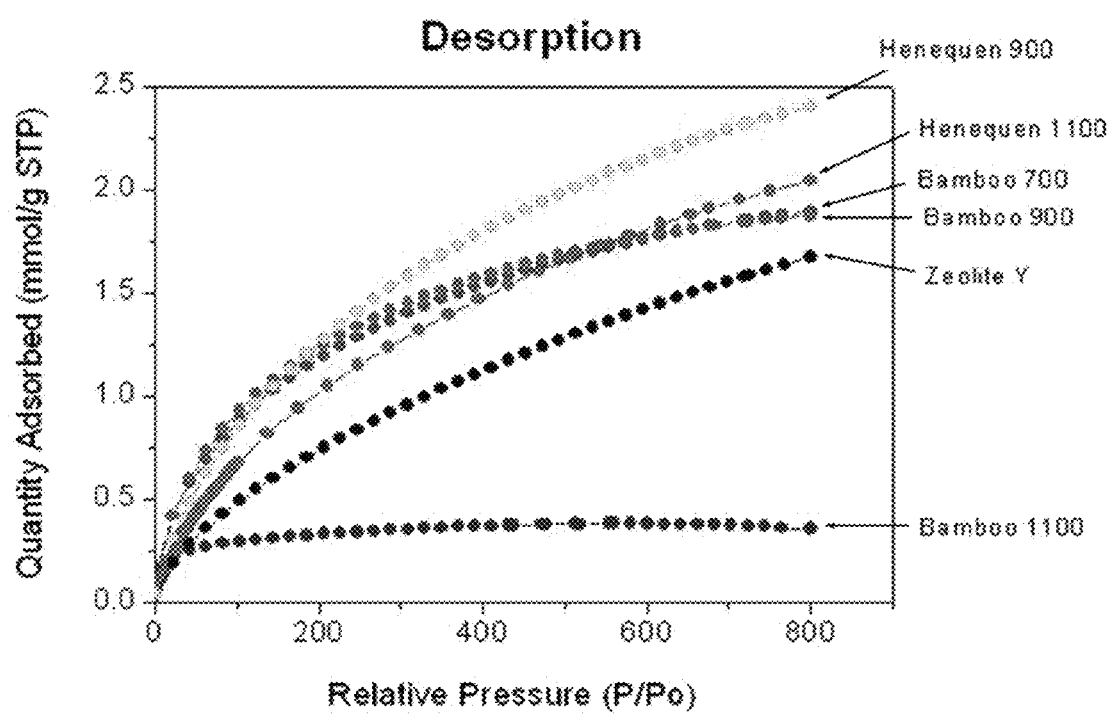
FIG. 2 shows the quantities of carbon dioxide desorbed from carbon dioxide absorbents prepared in Examples 1 and 1-1 and Zeolite Y as a conventional carbon dioxide absorbent, which were measured in accordance with Test Example 2.

The carbon dioxide adsorption/desorption performance and rates of the carbon dioxide absorbents were measured using an accelerated surface area and porosimetry analyzer ASAP2010 (Micromeritics) in the pressure range of 0 to 800 mmHg at room temperature. The results are shown in FIGS. 1 to 4. As shown in FIG. 1, Henequen 900 adsorbed the largest quantity of carbon dioxide (2.41 mmol), and Henequen 1100 adsorbed the second largest quantity of carbon dioxide (2.05 mmol). The bamboo samples adsorbed smaller quantities of carbon dioxide than Henequen 900 but adsorbed a quantity of carbon dioxide comparable to Henequen 1100 despite their considerably smaller BET surfaces than the henequen samples. Specifically, Bamboo 700 and Bamboo 900 adsorbed 1.9 mmol and 1.88 mmol of carbon dioxide, respectively, less than the henequen samples. On the other hand, Zeolite Y adsorbed a relatively small quantity of carbon dioxide (1.67 mmol) compared to Henequen 900, Henequen 1100, Bamboo 700 and Bamboo 900. The desorption curves of FIG. 2 showed a similar tendency to the absorption curves of FIG. 1. From these results, it can be inferred that the $CO_2$ adsorptivity of Henequen 900 was highest and that of Bamboo 700 and Bamboo 900 follows in this order.

Figure 3:
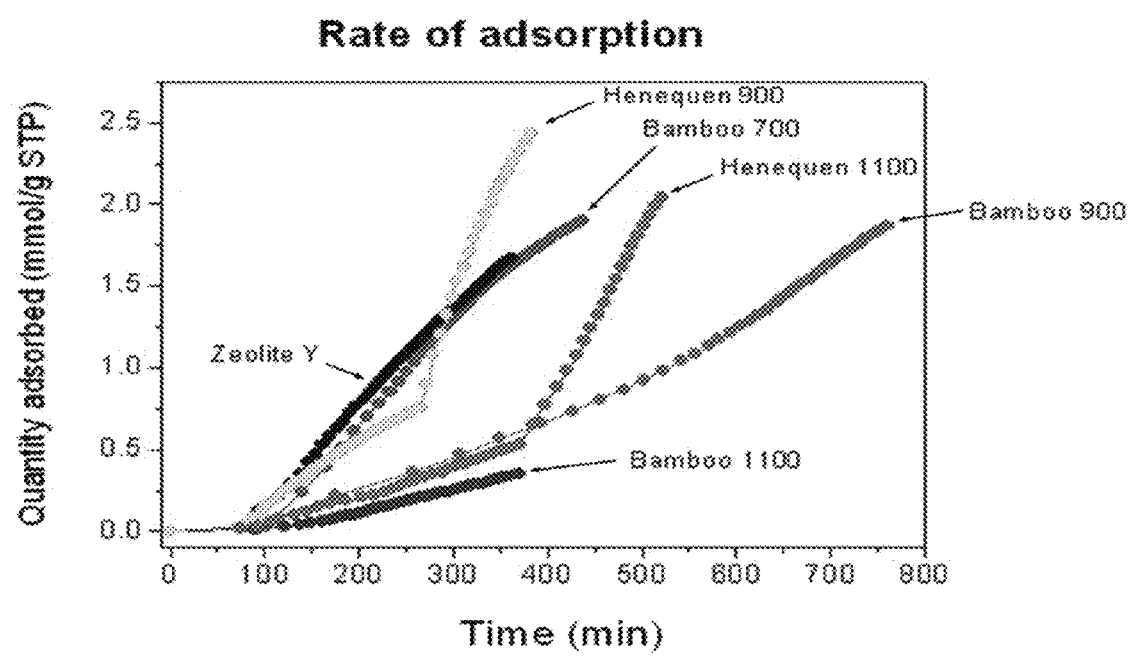
FIG. 3 shows the rates of adsorption of carbon dioxide on carbon dioxide absorbents prepared in Examples 1 and 1-1 and Zeolite Y as a conventional carbon dioxide absorbent.
Figure 4:
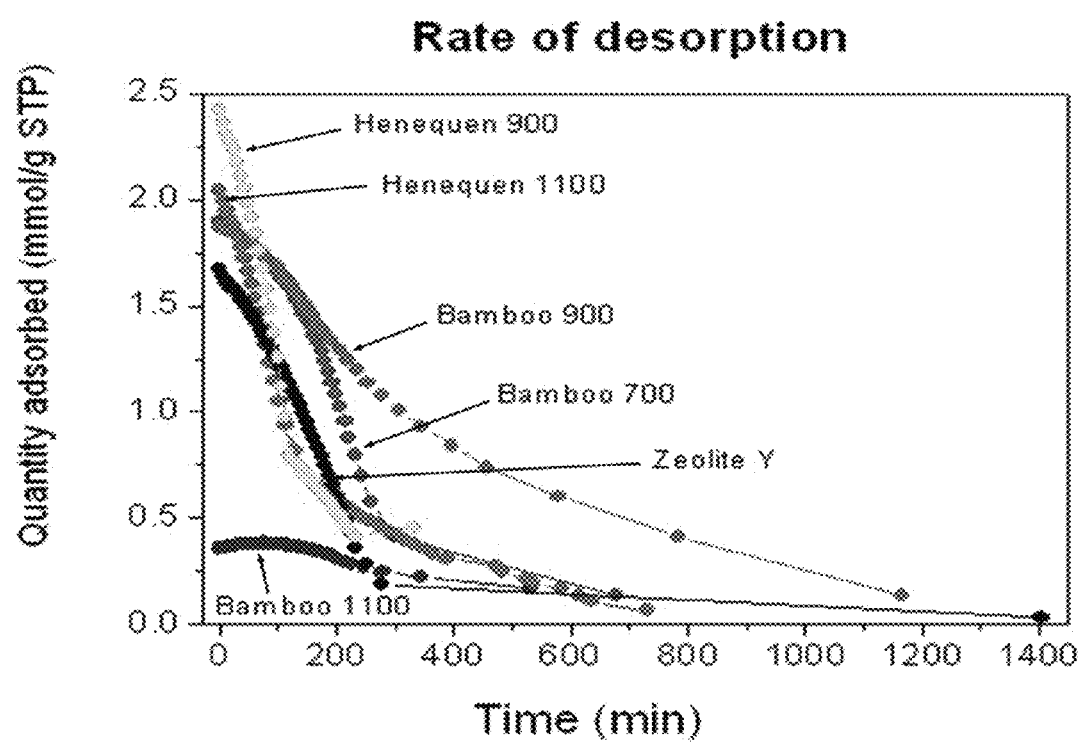
FIG. 4 shows the rates of desorption of carbon dioxide from carbon dioxide absorbents prepared in Examples 1 and 1-1 and Zeolite Y as a conventional carbon dioxide absorbent.

The adsorption and desorption rates of the absorbents were compared based on the results shown in FIGS. 1 and 2, and the results are shown in FIGS. 3 and 4, respectively. In these figures, Henequen 900 was found to have higher adsorption and desorption rates than the conventional zeolite samples, demonstrating that Henequen 900 is very useful in actual applications.

In conclusion, Henequen 900 has better ability to adsorb carbon dioxide and higher $CO_2$ adsorption and desorption rates than the conventional zeolite samples. This fact proves the usefulness of Henequen 900 in actual applications. Although the bamboo carbonization samples (particularly, Bamboo 700) showed slightly inferior characteristics in terms of the total adsorptivity and adsorption/desorption rate, their application would be very desirable because their biomass resources are available in Korea and can be prepared in an economical and simple manner.

TEST EXAMPLE 3

Measurement of Carbon Dioxide Adsorption
(Chemical Adsorption)

The quantities of $CO_2$ chemically adsorbed to the carbon dioxide absorbents of Examples 1 and 1-1 were calculated using a Micromeritics Autochem 2910 analyzer. First, the carbon dioxide absorbents (Henequen 900 and Zeolite Y) in the form of powders were heated to 200° C. in an argon atmosphere to remove moisture, and chemical adsorption tests were conducted in a pulsed mode at room temperature (25° C.). As a result of the chemical adsorption testing, Henequen 900 adsorbed 5.2 ml/g $CO_2$ and Bamboo 700 adsorbed 4.5 ml/g $CO_2$, whereas substantial chemical adsorption did not occur in Zeolite Y. From these results, the increased quantities of $CO_2$ chemically adsorbed to the henequen or bamboo samples are thought to be due to the presence of the alkali and alkaline earth metal components inherent to the samples. No chemical adsorption in Zeolite Y is explained by the absence of active sites where carbon dioxide is chemically adsorbed on the surface of Zeolite Y.

The results of Test Examples 2 and 3 confirm better performance of the carbon dioxide absorbents based on natural biomass prepared in accordance with the method of the present invention.

TEST EXAMPLE 4

ED-XRF Analysis

Energy dispersive x-ray fluorescence (ED-XRF) analysis was conducted to analyze the components of the henequen carbonization products and the bamboo carbonization products used as the carbon dioxide absorbents prepared in Examples 1 and 1-1. The results are shown in Table 3. The henequen products were obtained by carbonization at temperatures of 500° C., 700° C., 900° C., 1,100° C., 1,300° C., 1,500° C., and 1,800° C., and the bamboo products was obtained by carbonization at temperatures of 700° C., 900° C., 1,100° C., 1,300° C., 1,500° C., and 1,800° C.

TABLE 3

|  | K (wt %) | Ca (wt %) | Si (wt %) | P (wt %) |
|---|---|---|---|---|
| Henequen 500 | 4.98 | 93.57 | — | — |
| Henequen 700 | 3.68 | 95.46 | — | — |
| Henequen 900 | 2.79 | 95.53 | — | — |
| Henequen 1100 | 2.82 | 95.59 | — | — |
| Henequen 1300 | 2.94 | 95.97 | — | — |
| Henequen 1500 | 2.62 | 94.58 | — | — |
| Henequen 1800 | 1.25 | 96.86 | — | — |
| Bamboo 700 | 75.55 | 16.17 | 0.00 | 2.11 |
| Bamboo 900 | 74.43 | 15.09 | 5.21 | 2.15 |
| Bamboo 1100 | 75.26 | 16.54 | 4.49 | 1.81 |
| Bamboo 1300 | 72.53 | 19.31 | 5.32 | 1.92 |
| Bamboo 1500 | 63.65 | 25.88 | 5.63 | 3.53 |
| Bamboo 1800 | 16.20 | 42.44 | 32.61 | 8.24 |

The ED-XRF analytical results shown in Table 3 are the relative proportions of the metal components in the samples and the numbers indicated by wt % are not absolute values but relative proportions. As shown in Table 3, the henequen and bamboo samples were found to include alkali and alkaline earth metals, such as K and Ca. In addition, the Ca contents of the henequen samples were much higher than the K contents thereof, whereas the K contents of the bamboo samples were high relative to the Ca contents thereof. The absolute metal contents were confirmed by a suitable technique, such as inductively coupled plasma optical emission spectrometry (ICP-OES).

What is claimed is:

1. A method for preparing a carbon dioxide absorbent based on natural biomass, the method comprising:
   (S1) carbonizing a plant biomass material containing alkali metals or alkaline earth metals by raising the temperature of the plant biomass material from 700 to 1,800° C. under a nitrogen and hydrogen in a volume ration of 1:1 atmosphere in a closed state for 0.2 to 2 hours; and
   (S2) pulverizing the carbonized biomass material, wherein the plant biomass material containing alkali metals or alkaline earth metals is plant cellulose selected from the group consisting of henequen fibers, abaca, jute, ramie, and mixtures thereof.

2. The method of claim 1, wherein the carbonization in step S1 is performed by raising the temperature of the plant biomass material from 900 to 1,100° C. under the nitrogen/hydrogen atmosphere in a closed state for 0.2 to 2 hours.

3. The method of claim 1, wherein step S1 further comprises impregnating the plant biomass material with liquid nitrogen and cutting the frozen plant biomass material to a length of 1 to 2 mm before carbonization.

4. The method of claim 1, wherein the carbon dioxide absorbent prepared in step S2 has a thickness of 0.5 mm or less and a length of 1 mm or less.

5. The method of claim 1, wherein the alkali metal contained in the plant biomass material is selected from the group consisting of lithium, sodium and potassium and the alkaline earth metal contained in the plant biomass material is calcium or magnesium.

6. A carbon dioxide absorbent based on natural biomass that is prepared by the method of claim 1, wherein the carbon dioxide absorbent utilizes natural alkali and alkaline earth metals inherent in the natural biomass.

* * * * *